Aug. 23, 1955      R. W. DOUGHERTY      2,715,761
APPARATUS FOR EXPANDING MATERIALS
Filed Oct. 28, 1953      3 Sheets-Sheet 1

INVENTOR.
Ralph W. Dougherty
BY
Harry N. Leovu
Att'y

Aug. 23, 1955    R. W. DOUGHERTY    2,715,761
APPARATUS FOR EXPANDING MATERIALS
Filed Oct. 28, 1953    3 Sheets-Sheet 2

INVENTOR.
Ralph W. Dougherty
BY Harry H. Levin
Att'y

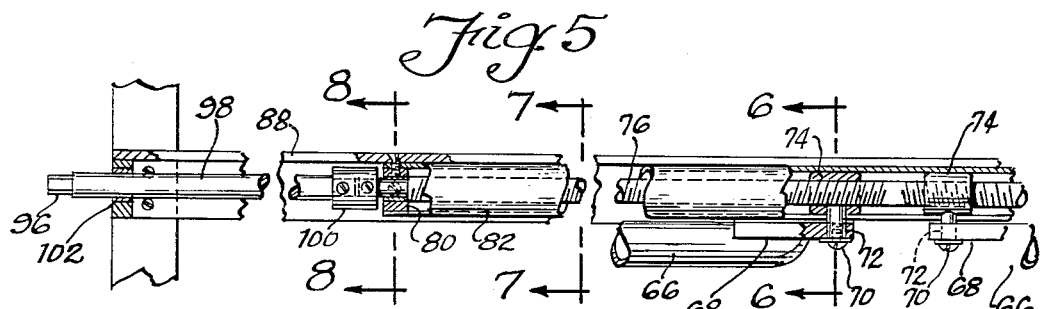
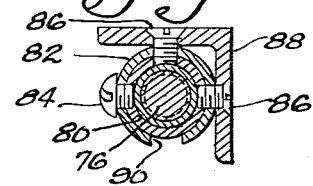
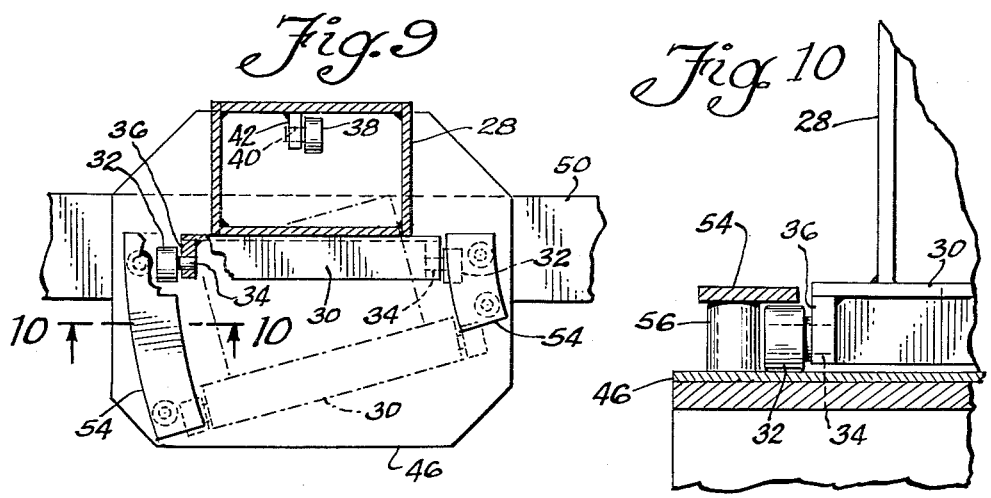
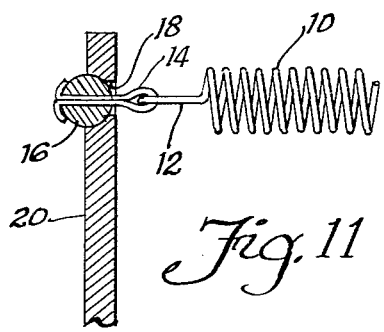

United States Patent Office 2,715,761
Patented Aug. 23, 1955

2,715,761

APPARATUS FOR EXPANDING MATERIALS

Ralph W. Dougherty, North Little Rock, Ark., assignor to The Visking Corporation, Chicago, Ill., a corporation of Virginia Application October 28, 1953, Serial No. 388,733

4 Claims. (Cl. 26—54)

This invention relates to expanding materials transversely to the lengthwise direction of manufacture thereof. More particularly, it relates to a web spreader unit especially suitable for incorporation in the production line for making bonded nonwoven fabrics.

Bonded nonwoven fabrics have been produced by forming appropriate fibers into a continuous web of either a single or multi-ply structure and then subjecting the web to a treatment which bonds the fibers. In one process for producing a multi-ply structure, a plurality of carding machines operating in tandem delivered the webs from successive cards in superimposed relationship onto a moving conveyor, which after removal therefrom was passed between calender rolls to compress and densify the web prior to subjecting it to the bonding treatment.

In general, the width of the product was less than the width of the web delivered by the cards. Attempts have been made to stretch the web transversely by means of multiple discs individually driven by a belt drive and positioned upstream of the calender rolls. However, such spreader devices were not satisfactory because of instability of the spread adjustment between adjacent discs and nonuniform speeds of the separately driven discs. Even when the discs were uniformly spaced and driven, the portion of the thin fiber web which was unsupported between adjacent discs stretched disproportionately to sections of the web actually supported by the periphery of the discs. This nonuniformity was most apparent at the edges of the web, since certain overhang of the outermost discs was necessary for operation. In addition, such disc-type spreaders required considerable maintenance and adjustment.

An object of this invention is to provide a new and novel apparatus for spreading webs transversely thereof.

Another object of this invention is to provide an apparatus for substantially uniformly expanding fiber webs transversely.

A further object of this invention is to provide a simple, easy-to-operate and efficient apparatus for transversely spreading fiber webs.

Other and additional objects will become apparent hereinafter.

The above objects are accomplished, in general, by providing a spreader unit wherein a plurality of extensible coil springs in spaced relationship are circumferentially disposed between and secured to a pair of spaced end discs and constitute the peripheral wall of the spreader unit. The end discs are angularly positioned to provide a spreading angle (angle included between the discs) so that upon rotation of the unit about its horizontal axis, each spring during each revolution of the unit will accommodate itself to the varying distances between the discs and in so doing will be gradually and uniformly stretched until it reaches the position of maximum expansion required by the discs, and thereafter it will contract gradually and uniformly until it reaches a position of maximum contraction permitted by the unit. Means are provided to adjust the angularity of the discs so that the web can be expanded to the desired width without interrupting operations.

In a preferred embodiment of the invention, the spreader unit is positioned in the production line for making nonwoven fabrics. According to this embodiment, a plurality of carding machines operating in tandem deliver the webs from successive carding machines in superimposed relationship on a moving conveyor which transports the web to a location from which it is fed onto such portion of the peripheral wall of the rotating spreader unit wherein the springs are not in the maximum expanded condition. As each spring is stretched it expands the web thereon with the result that uniform expansion of increments of the web in its entire width is obtained. After the web has been expanded to the desired width, it is stripped from the spreader unit and passed between calender rolls which compress and densify the web. Thereafter the resulting web is subjected to the desired treatments for bonding the fibers.

Since in the aforementioned embodiment the spreader unit is incorporated into and forms an integral part of a production line, the peripheral speed thereof must necessarily be closely related to the operating of line speed.

The arc of contact between the web and the springs of peripheral wall of the spreader unit during the spreading operation is such as to expand the web to the desired length. In general, such arc of contact is controlled by the position of the take-off calender rolls and the input conveyor roll relative to the spreader unit. However, if desired, appropriate means positioned at either the input or take-off sides or both may be provided to decrease or increase the distance of the arc of contact of the web and the spreader unit.

The extent of expansion of a web depends on the size of the width of the original web, the diameter of the end discs, and the spreading angle between the discs. Usually, in a spreader unit, the diameter of the discs and the peripheral wall are constant, and the spreading angle between the discs is adjusted in accordance with the width of the original web and the desired final width thereof.

The diameter of the springs and the spacing between adjacent springs should be such that during operation the web is uniformly supported and uniform expansion of increments of the web over its entire width is obtained. The spacing for any setup can be determined by empirical experiment. Such satisfactory results have been obtained in a spreader unit containing 42 springs (½" outer diameter x ⅛" pitch x 29¼" long), equally spaced on 17" pitch diameter (1.27").

Due to the construction of the peripheral wall the web can be released without distorting the fibers in contact therewith. The spring members permit release of a web of fibers from the peripheral wall of the unit without deforming or plucking individual fibers from the body of the web and the individual coils of the spring members provide arcuate lines of contact as means for gripping and expanding the web formation.

The nature of the invention and the manner in which it may be practiced will become clear from the following detailed description of an illustrative embodiment of the invention when taken in conjunction with the accompanying drawings forming a part of this specification and wherein, Figure 1 is a side elevation of the spreader unit showing its position in a production line for making nonwoven fabrics, the other details of the line shown being diagrammatic;

Figure 5 is a section taken on line 5—5 of Figure 1, with parts thereof being broken away and in section;

Figure 6 is a section taken on line 6—6 of Figure 5;

Figure 7 is a section taken on line 7—7 of Figure 5;

Figure 8 is a section taken on line 8—8 of Figure 5;

Figure 9 is a section taken on line 9—9 of Figure 1;

Figure 10 is a section taken on line 10—10 of Figure 9, and

Figure 11 is a section taken on line 11—11 of Figure 1.

Figure 1:
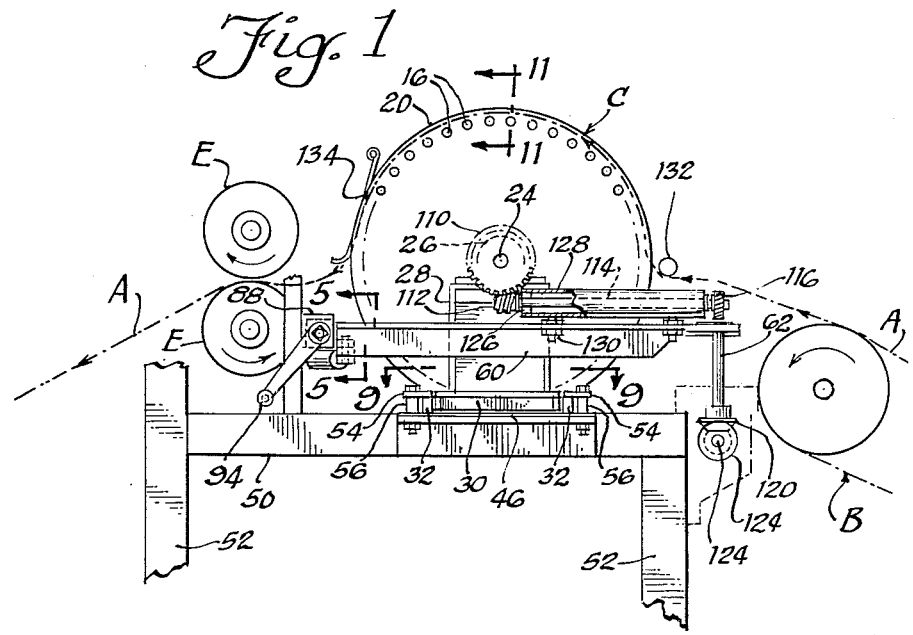

Referring now to the drawings wherein like reference numerals and characters designate like parts, the reference character A designates a nonwoven web formed of a plurality of superimposed webs delivered from successive carding machines operating in tandem on a conveyor B. The conveyor B transports web A to a location from which it is passed onto the spreader unit C. The web A, after it has been expanded transversely to the desired width by the spreader unit C, is stripped therefrom and passed between a pair of calender rolls E. After passing through the calender rolls E, the web A continues through the remainder of the production line wherein it is subjected to the desired treatments for bonding the fibers.

The spreader unit C is formed of a plurality of extensible coil springs 10 circumferentially arranged to constitute the peripheral wall of the unit. As clearly shown in Figure 11, the opposite ends 12 of each spring 10 is secured by a cotter pin 14 which, in turn, is secured in spherical bearing 16 disposed in hole 18 adjacent the periphery of end discs 20. The wall of hole 18 is of a shape so that it will permit bearing 16 to adjust itself regardless of the position of the spring 10 secured therein.

In accordance with the principles of this invention, each of the end discs 20 is operatively connected to individual means whereby each disc can be angularly disposed relative to the other at the desired spreading angle. Inasmuch as the operative means for angularly positioning both end discs are of similar construction, the description hereafter of one will be applicable to both.

End disc 20 is mounted on one end of shaft 24 rotatably mounted in a pair of spaced bearings 26 secured on bearing support 28. For reasons which will become apparent hereinafter, bearing support 28 is secured to bracket support 30. Rollers 32 are rotatably mounted on pins 34 secured in legs 36 of the bracket base. Roller 38 is rotatably mounted on pin 40 secured in arm 42 of the bearing bracket 28. Rollers 32 and 38 rest on and are adapted to ride on plate 46, secured to crosspiece 50, carried by vertical frame members 52. Rollers 32 are maintained in position and guided during the angular positioning of end disc 20 by hold-down plates 54 secured to supports 56 appropriately secured to plate 46. Since rollers 32 will move in an arc, hold-down plates 54 are correspondingly shaped.

Bearing bracket 28 is appropriately secured to lever 60 which at one end thereof is pivotally mounted on vertical shaft 62. The other end of lever 60 is connected by link 64 to another link 66 which, in turn, as is shown in Figures 5 and 6, secured to arm 68 which, in turn, is connected by screw 70 to pin 72 carried by follower 74.

As shown in Figure 5, follower 74 is adapted to ride on screw 76, which is rotatably mounted in bushing 80 in a tubular housing 82. Screw 84 fastens bushing 80 to housing 82. Screws 86, in addition to securing the bushing 80 and housing 82 together, secures the assembly to angle 88 carried by the frame of the machine. The housing 82 is provided with an elongated slot 90 wherein pin 72 carried by follower 74 may move longitudinally thereof upon rotation of screw 76.

In order that end discs 20 may be moved toward or away from each other to provide the desired disc angularly, the two followers are oppositely threaded, i. e., one threaded in one direction, and the other threaded in the opposite direction, and the portions of screw 76 with which such followers cooperate are appropriately threaded so that upon rotation of screw 76, followers 74 will move either toward or away from each other. Rotation of screw 76 in the desired direction is obtained by turning, in the appropriate direction, crank 94 removably fitted on free end 96 of rotatable crankshaft 98, which is secured at its other end by coupling 100 to the screw 76. Crankshaft 98 is also rotatably supported in bushing 102 secured in support 88.

From the foregoing it is apparent that upon rotating crank 94 in the desired direction, rotary movement will be imparted to screws 76 and both followers 74 will travel thereon in a direction toward or away from each other. The movements of followers 74 are translated through the respective linkage 68, 66, 64 to levers (60) with the result that bearing brackets 28, together with the parts supported thereby, including end discs 20, will be moved to provide the desired angularity of discs 20 relative to each other. Rollers 32 and 38 permit the movements of brackets 28 with ease on plate 46.

Figure 2:
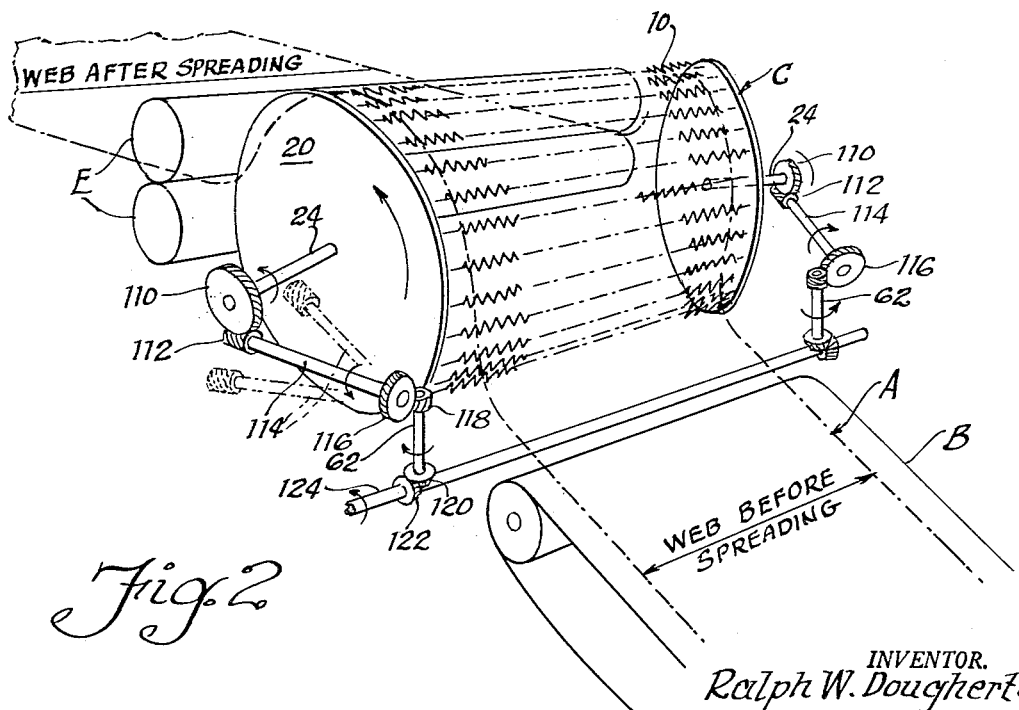
Figure 2 is a perspective diagrammatic illustration of the spreader unit showing the drive therefor.
Figure 3:
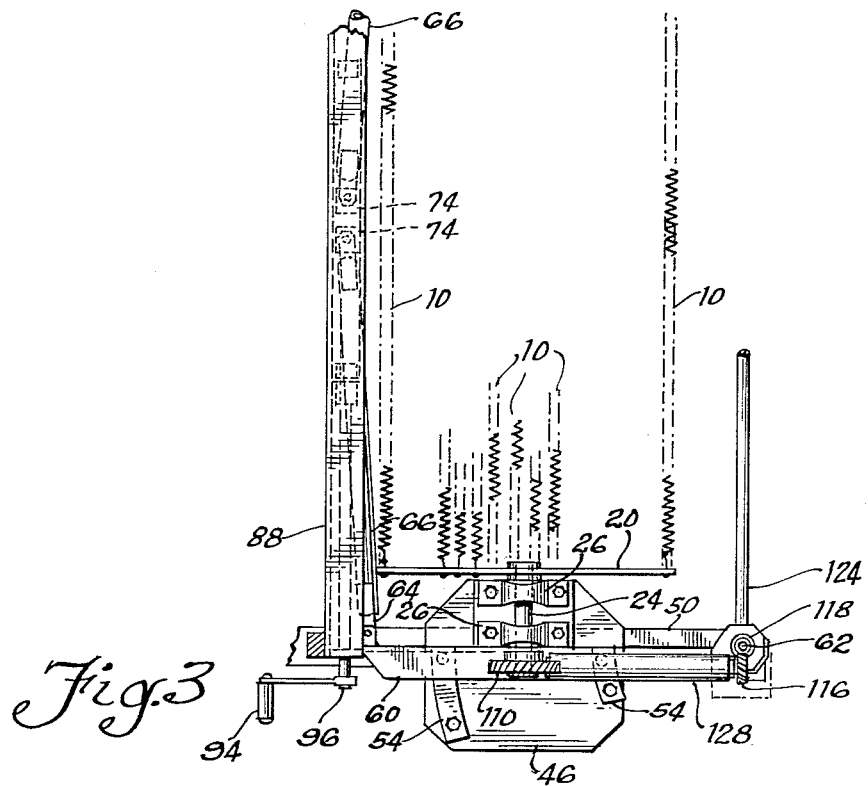
Figure 3 is a half-plan view of the spreader unit shown in Figure 1.
Figure 4:
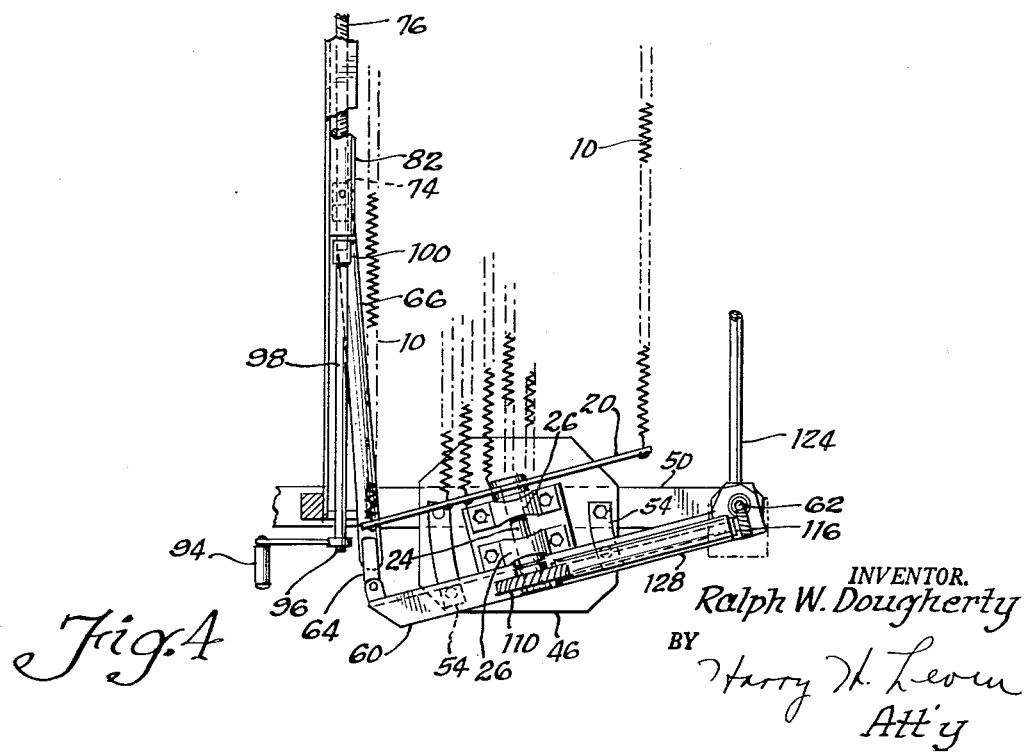
Figure 4 is a half-plan view of the spreader unit showing the end disc angularly disposed.

As previously mentioned, each of disc shafts 24 is driven through a drive which permits the adjustment of the angularity of end discs 20 without interrupting operations. As shown in Figures 1 and 2, each shaft 24 is provided with a gear 110, which is driven by a worm 112, carried on one end of horizontally disposed shaft 114. At its opposite end shaft 114 is provided with a gear 116 driven by a gear 118 carried on one end of vertical shaft 62. The other end of shaft 62 is secured to beveled gear 120 which cooperates with gear 122 on a horizontal shaft 124 which is driven in any suitable manner from any appropriate source, not shown. In the form shown, shaft 124 is the common main drive for the drive cooperating with the respective discs 20. As shown in Figure 1, shaft 114 is by means of bushings 126 supported in housing 128, which is appropriately secured as at 130 to lever 60. From the foregoing drive construction, it is apparent that when the angularity of the end discs 20 is adjusted, gears 116 on shafts 114 will pivot about gears 118 without interrupting the other elements of the drive mechanism or operation of the unit.

In order to increase the arc of contact between the web and the peripheral wall of the spreader unit during the spreading operation, guide 132 is provided at the input side of the spreader unit. If desired, the arc of contact between the web and the spreader unit may be increased also by a guide at the take-off side of the unit as, for example, by means of a metal plate 134 appropriately secured in the frame. It is, of course, understood that the positions of these guides 130 and 132 relative to the unit will determine the arc of contact.

Though in the preferred embodiment the spreader unit is incorporated in a production line for the production of nonwoven fabrics, it is to be understood that the invention is not restricted thereto. The spreader unit may be used for transversely expanding the width of any expansible material.

The invention provides a spreader which continuously and uniformly supports the web during the spreading operation and results in uniform expansions of increments of the web in its entire width. Because of the construction the web is released from the spreading unit without distorting the fibers in contact with the same.

Since it is obvious that various changes and modifications may be made in the above description without departing from the nature or spirit thereof, this invention is not restricted thereto except as set forth in the appended claims.

I claim:

1. A web expanding apparatus comprising a spreader unit having a pair of end discs spaced from each other and positioned at a spreading angle, a plurality of uniformly spaced extensible coil springs disposed between and secured to said discs and constituting the peripheral wall of said unit, means to rotate said unit whereby the length of each spring gradually and progressively accommodates itself to the varying distances between said discs, means to feed continuously a web onto such portion of said peripheral wall wherein the springs thereof will be expanded upon rotation of said unit, each of said discs being mounted on a separate shaft, each shaft being mounted on a bearing carried on a bracket, each bracket being secured to a pivoted lever, and means to move each of said levers about its respective pivot and thereby adjust the angularity of said discs.

2. A web expanding apparatus comprising a spreader unit having a pair of end discs spaced from each other and positioned at a spreading angle, a plurality of uniformly spaced extensible coil springs disposed between and secured to said discs and constituting the peripheral wall of said unit, means to rotate said unit whereby the length of each spring gradually and progressively accommodates itself to the varying distances between said discs, means to feed continuously a web onto such portion of said peripheral wall wherein the springs thereof will be expanded upon rotation of said unit, each of said discs being mounted on a separate shaft, each shaft being mounted on a bearing carried on a bracket, each bracket being secured to a pivoted lever, one lever being secured through a linkage to a follower movable on a rotatable screw, the other lever being secured through a linkage to a second follower movable on said screw, the threads of one follower and portion of the screw cooperating with one link being in the opposite direction to that of the other follower and the portion of the screw cooperating therewith, and means to rotate said screw in the direction necessary to adjust the discs as desired.

3. A web expanding apparatus comprising a spreader unit having a pair of end discs spaced from each other and positioned at a spreading angle, a plurality of uniformly spaced extensible coils springs disposed between and secured to said discs and constituting the peripheral wall of said unit, means to rotate said unit whereby the length of each spring gradually and progressively accommodates itself to the varying distance between said discs, means to feed continuously a web onto such portion of said peripheral wall wherein the springs thereof will be expanded upon rotation of said unit, means to adjust the angularity of the end discs, a drive for each of said discs, each of said drives including a rotatable shaft carrying a gear pivoted on and driven by a second gear on a second rotatable shaft, and means, actuated by said means to adjust the angularity of said discs, to move the pivotally mounted gear and its shaft about the pivot gear without interrupting the said drives during adjusting the angularity of said discs.

4. A web expanding apparatus comprising a spreader unit having a pair of end discs spaced from each other and positioned at a spreading angle, a plurality of uniformly spaced extensible coil springs disposed between and secured to said discs and constituting the peripheral wall of said unit, means to rotate said unit whereby the length of each spring gradually and progressively accommodates itself to the varying distances between said discs, means to feed continuously a web onto such portion of said peripheral wall wherein the springs thereof will be expanded upon rotation of said unit, each of said discs being mounted on a separate shaft, each disc shaft being mounted on a bearing carried on a bracket, each bracket being secured to a pivoted lever, means to move each of said levers about its respective pivot and thereby adjust the angularity of said discs, a drive for each disc shaft including a rotatable shaft carrying a gear pivoted on and driven by a second gear on a second rotatable shaft, and means to secure each of the pivotally mounted shafts to each of said levers respectively, whereby upon movement of said levers the shafts secured thereto will move correspondingly and the pivotally mounted gear will move about the pivot gear without interrupting the said drives during adjusting of the angularity of said discs.

References Cited in the file of this patent

UNITED STATES PATENTS

| | | |
|---|---|---|
| 258,947 | Upham | June 6, 1882 |
| 1,997,483 | Cluett | Apr. 9, 1935 |
| 2,171,551 | Hanning | Sept. 5, 1939 |

FOREIGN PATENTS

| | | |
|---|---|---|
| 545,277 | Great Britain | May 18, 1942 |